United States Patent Office 2,934,398
Patented Apr. 26, 1960

2,934,398

EXTRACTING TANNING AGENT WITH CATION-CONTAINING SOLUTION WITH SUBSEQUENT CATION EXCHANGE

Ivan Binko and Jaroslav Kolar, Otrokovice, near Gottwaldov, Czechoslovakia, assignors to Svit, narodni podnik, Gottwaldov, Czechoslovakia No Drawing. Application November 9, 1955
Serial No. 546,012

11 Claims. (Cl. 8—94.32)

This invention relates to a process for producing tanning liquors from vegetable tanning raw materials.

Attempts hitherto made to extract tanning materials from vegetable raw materials by means of alkali metal hydroxides, and this term is deemed to include ammonia, have not been successful, as the liquors obtained or the extracts produced therefrom by concentration were of an alkaline nature or of such weak acidity that their tanning properties were inadequate.

The extraction of tanning materials from vegetable raw materials by solution of sulphites or of mixtures of sulphites and bisulphites requires large quantities of these materials in a predetermined ratio to prevent the production of extracts of insufficient acidity. For this reason it is impracticable to use sulphites and bisulphites for the extraction of tanning materials from vegetable raw materials on a large scale to carry out the extraction process in all the diffusers of an extraction battery, or in a part thereof at a slightly alkaline reaction to permit the sulphites to react most readily and fully with the organic tanning compounds, or even to extract with substantial quantities of sulphites and under such conditions of addition into the extraction battery as to reach pH-values of the liquor greater than 5, since the liquors are so weakly acid that these liquors or the extracts produced therefrom by concentration or drying are unsatisfactory.

Similar difficulties have been encountered in the sulphitation of liquors or extracts from vegetable tanning raw materials, since it was impossible to use substantial quantities of sulphites and bisulphites, but especially of sulphites, or to operate at optimum reaction conditions, that is, under a moderately alkaline reaction, not even with solutions less acid than pH-values above 5, since the sulphited extracts obtained were of inadequate acidity and consequently their tanning capacity was very low.

It has now been found that it is possible to extract raw vegetable tanning materials even with alkaline solutions according to the present invention and to obtain quite unexpected results. The main feature of this new extraction process is the possibility of using even strongly alkaline substances, such as sodium hydroxide, ammonia, sodium carbonate, or a sulphite of sodium in such quantities that the extraction is performed in a slightly acid, alkaline, or even strongly alkaline medium, either in all the elements or in a part of the extraction battery, provided that the extraction products obtained, which are alkaline or so weakly acid as to be unsuited for tanning hides, are freed from cations by means of a suitable cation exchanger, and, if desired, also of anions of dissociated acids by means of an anion exchanger.

This new extraction process permits raw vegetable tanning materials, and particularly those which yield tanning materials of a condensed catechol nature, to be treated so as to yield substantially higher amounts of tanning materials than has hitherto been possible by extraction with water alone, or by water with the addition of limited quantities of sulphites, as is usual, for example, in the case of the production of liquors and extracts from pine bark. If the known method of adding sulphites and bisulphites for improving the extraction is used, the yield of tanning materials obtained from vegetable raw materials by slightly acid or alkaline extraction can be increased by subsequently removing the cations by means of a suitable cation exchanger, the yield in some cases being twice as high as obtained hitherto by extraction with water or other known extracting methods, without any deterioration of the tanning properties of the liquors obtained.

Such unexpected results are obtained by the present process due to the fact that in vegetable tanning raw materials, especially in those tanning agents which are of a condensed nature, the low-molecular tanning substances are converted into higher condensed products when plant life stops, and thereafter resist extraction with water alone, or with water and quantities of sulphites small enough to yield weakly acid or even weakly alkaline extracted liquors. Alkali or more substantial quantities of sulphites in a weakly acid or alkaline medium dissolve the aforesaid high-molecular tanning materials, which by themselves are insoluble or of low solubility in water or in weak sulphite solutions, and pass them into the liquor, or give rise to a reduction of the molecular size or their sulphonation so that even after a partial or complete removal of the alkaline cations the high-molecular tanning agents do not separate out of the liquor in the form of sludges, but remain in solution together with the other tanning substances or are peptized. This is quite an unexpected effect, as it was rather to be presumed that in high-molecular tanning materials dissolved by alkaline extraction without any violent process, such as, extraction under pressure, the degree of condensation of the high-molecular tanning materials would not be reduced, and that these materials would, therefore, become insoluble after the removal of the cations from the liquors, and that a decrease of the pH-value would result in their settling in the form of sludges, which would render the new process technically useless.

The process for producing liquors and extracts of tanning materials according to the present invention is of a particular importance for the treatment of those plant parts in which the plant deposits tanning materials in substantial quantities, so as to form a protective shell for the body of the plant to resist water, weather influences and parasites for example, such for example as the bark of the tree and more particularly the surface layer of the bark, the so-called cork-layer. If only unsatisfactory yields of tanning material are obtained by extraction with water or with water containing limited amounts of sulphite from the surface layers of the bark, the extracted tanning materials are drawn mainly from the parenchymal tissue which was alive during the lifetime of the plant. The use of the process according to the present invention permits very good yields of tanning materials to be obtained even from the withered parts of the bark, the yields attained amounting even to double those obtained by the best water extraction process hitherto known.

The present process for the production of liquors and extraction thus permits advantageous utilization of certain vegetable tanning raw materials which, when extracted by water alone or by water with addition of limited quantities of sulphites, would give quite inadequate yields of tanning materials, so that in such cases the extraction would be too expensive and the extracts would, therefore, also be too expensive.

Moreover, the present process permits the sulphitation of the tanning materials to be carried out in the course of the extraction. Sulphites for example sodium sulphite, or sulphite-alkali mixtures, for example sodium sulphite and sodium hydroxyde, are used in such amounts as to make the extraction conditions favourable for a reaction between the sulphite and the tanning materials, whereby not only the tanning materials to be extracted are sulphited in several stages, but also hitherto unobtainable yields of tanning materials are produced from the material under treatment. The new process is advantageous not only for carrying out the sulphitation-extraction of pine bark, but also for the production of sulphited quebracho wood, mimosa bark and of other extracts, and for the production of extracts for special uses, such as the rapid production of liquors of strongly sulphited extracts, the so-called bleaching extracts.

When degradation products of pectinous substances are liable to be present in the liquors, the sulphitation of the raw vegetable tanning materials may be carried out, if desired, after the extraction from the raw material in a suitable alkaline medium, the cations then being removed by a suitable cation exchanger and the liquors thus treated being finally thickened.

A very substantial advantage of the present process for producing liquors and extracts from raw vegetable tanning materials resides in the fact that the liquors or extracts are freed by the treatment with ion exchangers to a large extent or completely from those compounds or ions which do not tan, for example metallic cations, anions of organic or inorganic acids, or salts of organic or inorganic acids. By the removal of such ions or impurities from the tanning extracts, their solubility and peptization in water is greatly improved, as both the acid salts and acids have a salting out effect on the tanning materials, more particularly in rather dilute solutions, such as are used for tanning hides.

This effect is especially noticeable when substantial quantities of sulphite are used during the extraction or in sulphitation after extraction. The salting out effect of the sulphites on the tanning substances is especially intense and the precipitation of the tanning materials in the form of sludges causes very great economical losses in tanneries. Furthermore, the presence from salts in the liquors made of vegetable tanning material always results in a slowing down of the diffusion of the tanning materials into the hide, such slower tanning being a great obstacle to the production of tanned leathers.

The new method for extracting tanning materials or agents is also of great importance for the production of tanning extracts for the rapid tanning of leather, such as rapid tanning by acidulated mimosa bark extracts, the so-called "hot pit" tanning process. If the liquors obtained by alkali extraction are treated only with a cation exchanger, their acidity may be increased to that of the free organic acids formed during the treatment by the decomposition of the organic salts present in the liquors, so that the liquors have a pH-value of up to 2.7. In the case of an extraction in which a sulphite is added, the liquor acidity may be increased to that of free sulphonic acids and, consequently, the pH-values of the resulting liquors are lower than 2. According to the amount of cation exchanger used for treatment, it is possible to produce extracts of any chosen acidity within the aforementioned lower limits.

The use of ion exchangers for the removal of cations, anions and salts is known as such, and it has already been suggested to utilize cation and anion exchangers during the processing of waste liquors from the production of sulphite cellulose containing, as a rule, substantial quantities of inorganic salts. It has also been previously proposed to treat liquors obtained by the aqueous extraction of raw vegetable tanning materials with suitable cation exchangers for the removal of mineral substances, and more particularly, for the removal of iron and copper cations.

However, the process according to the present invention is concerned with the extraction of raw vegetable tanning materials either by solutions of alkalies alone, or by solutions of alkalies with the addition of sulphites, or finally by sulphites alone under such reaction conditions in the extraction battery that higher yields of tanning extracts are achieved than in the case of extraction by the methods hitherto known. The liquors, which would be of inadequate acidity for use as leather tanning extracts, are then treated by cation exchangers, or by both cation and anion exchangers.

This process is new and has an unforeseeable effect, as it seemed rather probable that the liquors and extracts produced thereby would form excessive amounts of sludge. The new process according to the present invention is of great importance for the tanning extract industries.

*Example 1*

Pine bark obtained by peeling felled trees and by drying, and containing, according to the usual method of determination, 11 percent of extractable tanning material, is extracted in the usual way at elevated temperature in an extraction battery consisting of eight extractors. 1.5 percent sodium hydroxide on the weight of the bark under treatment are used in the extraction. The sodium hydroxide is introduced into the sixth extractor, the first extractor containing the spent bark. The liquor obtained is freed from cations by means of a strongly acid cation exchanger of the phenol-formaldehyde resin type sulphonated in the omega position. The ion exchange resin is contained in a column of conventional construction through which the tanning liquor is passed by gravity or by pump action. The liquor thus obtained is freed from the anions of the dissociated acids in the same way by means of a weakly alkaline anion exchanger of the aminophenol-formaldehyde resin type. The liquor is of the same dispersity as a liquor produced in the usual way by extraction with water alone under moderate temperature conditions. The tanning yield amounts to 15 percent of the weight of the bark under treatment.

Instead of treating the liquor by both cation and anion exchangers, it is possible to remove only the cations therefrom by means of the aforesaid cation exchanger. Liquors thus treated have a pH-value of about 2.7 and the same dispersity as conventional solutions of pine bark extracts with a pH-value of about 4.0.

*Example 2*

Pine bark obtained by peeling felled trees and by drying, and containing according to the usual determination method, 11 percent of extractable tanning materials, is extracted in the usual way at elevated temperature in an extraction battery consisting of eight extractors. 7 percent sodium hydroxide on the weight of the bark under treatment are introduced into the sixth extractor, the first extractor containing the spent bark. The liquor is freed first from cations by a strongly acid cation exchanger and then from anions of the dissociated acids by a weakly basic anion exchanger. The liquor is of the same dispersity as a liquor obtained by conventional extraction with water alone under moderate temperature conditions. The yield in tannin is 20 percent of the weight of the bark under treatment.

Instead of sodium hydroxide, other suitable alkaline substances can be used in the process, for example ammonia.

Instead of a weakly basic anion exchanger it is possible to use a strongly basic exchanger of the quaternary base type.

*Example 3*

Mimosa bark is extracted first by cold treatment in a single extraction vessel with cold water with the addition of 25 percent ammonia to remove the pectins therefrom. It is then extracted in the usual manner with water at elevated temperature in an extraction battery consisting of eight extractors. The liquor is then freed from the cations by a strongly acid cation exchanger in a column, through which the liquor flows by gravity or is pumped. The liquor treated with the cation exchanger is clear and has a pH-value of about 2.7. It may be evaporated so as to form an extract.

Instead of extraction by water alone, it is possible to extract at elevated temperature after alkaline treatment with a solution of sodium sulphite.

*Example 4*

Pine bark obtained by peeling felled trees and by drying, and containing, according to the usual determination method, 12.5 percent extractable tanning materials, is extracted at elevated temperature in the usual way in an extraction battery consisting of eight extractors. 5 percent anhydrous sodium sulphite on the weight of the bark under treatment are introduced into the sixth extractor, the first extractor containing the spent bark. The liquor is centrifuged or filtered on a filter-press so as to remove mechanical impurities, and is treated by a strongly acid cation exchanger which is added to the liquor under stirring until the pH-value of the liquor is reduced to 3. Thereupon, the ion exchanger is strained off and the liquor is evaporated to the extract. The solutions of the extract are clear and free of insolubles, unlike those of extracts produced by hot extraction of pine bark with water alone or with water containing 0.6 percent sodium bisulphite and 0.6 percent sodium sulphite on the weight of the bark under treatment which is the dosage of sulphites commonly employed in the conventional method of sulphitation extraction. The yield of tanning substances is 16.5 percent of the weight of the bark under treatment.

The tanning materials of this extract readily penetrate through the hides and are suitable for the production of heavy tanned leathers.

Instead of the aforementioned treatment by a cation exchanger, it is possible to treat the liquor with a cation exchanger in special ion-exchange columns permitting continuous delivery of the extract at a pre-determined pH-value.

Mimosa bark, oak wood, chestnut wood, quebracho wood and other tanning materials may be treated in the same manner as pine bark.

*Example 5*

Pine bark withered slowly on the tree and containing according to determination by the usual method, 4.5 percent extractable tanning materials is treated in the same manner as described in Example 4. The yield in tanning substances amounts to 16.5 percent of the weight of the bark under treatment. The quality of the extract obtained by evaporating the liquor prepared in the aforesaid manner equals that of the extract produced in accordance with the method referred to in Example 4.

Broken or chipped bark from felled trees, steamed pine bark, the bark obtained by mechanical cutting from the wood and bark from withered trees may be treated in the same way.

*Example 6*

Pine bark peeled from felled trees and dried is extracted in an extraction battery consisting of eight extractors at 80 to 90° C. with the addition of 1 percent sodium hydroxide and 3 percent anhydrous sodium sulphite to the sixth extractor, the first extractor containing the spent bark. A portion of the extract is freed of cations by a strongly acid cation exchanger and thereupon mixed with the remaining alkaline liquor in such a mixing ratio that the resulting mixture has a pH-value of about 3.5.

*Example 7*

An extract from quebracho wood, obtained by hot extraction with water, is alkalised by addition of sodium hydroxide to a pH-value of 8. 5 percent of sodium sulphite on the tanning materials contained in the extract are added, and the liquor is heated until a test portion remains clear after cooling and acidulation with acetic acid. The liquor is then treated with a strongly acid cation exchanger in the same way as described in Example 4, and is then evaporated to an extract. The extract thus obtained contains less mineral substances than the quebracho extract sulphited by conventional methods and is faster in swelling the hides and in tanning them throughout, so that it is more suitable for the production of heavy tanned leathers than is the usual sulphited quebracho extract.

It is also possible to treat quebracho wood liquors with sodium hydroxide and sodium sulphite instead of sodium sulphite alone.

Quebracho wood may be replaced by various other vegetable tanning materials in this treatment.

What we claim is:

1. In a process for producing tanning liquor from a vegetable raw material, the steps of extracting a tanning agent from said raw material with a solution of a compound including at least one cation and being selected from the group consisting of alkalis, sulphites, and mixtures thereof at a pH greater than 5; and treating the extracted liquor with an ion exchange material to exchange against hydrogen ions at least a portion of the cations introduced into said liquor by said compound, the ion exchange treatment being carried out until the pH value of said liquor is substantially smaller than 5.

2. In a process according to claim 1, said ion exchange material being of the omega-sulphonated phenol-formaldehyde resin type, and said liquor being treated with said ion-exchange material until the pH value of said liquor is not greater than 3.

3. In the process according to claim 1, treating the vegetable tanning raw material with water prior to extracting the same.

4. In a process according to claim 1, said ion exchange material being a cation exchanger.

5. In the process according to claim 4, using a resin of the hydrogen exchange type as said cation exchanger.

6. In the process according to claim 4, treating the extracted liquor, after treatment with the cation exchanger, with an anion exchanger to remove anions of dissociated acids from said liquor.

7. In the process according to claim 6, using a resin of the hydroxyl exchange type as said anion exchanger.

8. In a process according to claim 6, said anion exchanger consisting essentially of an ion-exchange material of the amino-phenol-formaldehyde resin type.

9. In a process according to claim 1, said solution being an aqueous solution and said compound being an alkali metal compound.

10. In a process according to claim 9, said compound being an alkali metal hydroxide.

11. In a process according to claim 9, said compound being an alkali metal sulphite.

References Cited in the file of this patent

UNITED STATES PATENTS

| 799,246 | Lepetit | Sept. 12, 1905 |
| --- | --- | --- |
| 2,667,417 | Delmousee | Jan. 26, 1954 |
| 2,676,980 | Tu | Apr. 27, 1954 |
| 2,682,468 | Frampton | June 29, 1954 |

(Other references on following page)

FOREIGN PATENTS

| | | |
|---|---|---|
| 1,057,060 | France | Mar. 12, 1952 |
| 1,057,061 | France | Oct. 28, 1953 |
| 44,486 | India | July 15, 1952 |

OTHER REFERENCES

Nachod et al.: "Ion Exchange Tech.," Academic Press, N.Y., 1956, p. 571.

"Progress in Leather Science," 1948, Br. Leather Mfgrs. Asso., London, pp. 241, 246 and 247.

McLaughlin: "Chem. of Leather Manuf.," Reinhold Pub. Co., N.Y., 1945, pp. 562, 563, 580, 581.

Nachod: Ion Exchange, Acad. Press Inc., 1949, pp. 319, 386, 388.

Okell: Acids and Salts as a Control Factor in Tannery Practice, J. of Internatl. Soc. of Leather Trades Chem., vol. 28–29, 1944–45, pp. 56–74, pp. 66 and 67.

Allegrini: Comparison of the Properties of Extracts of Chestnut, Mimosa and Quebracho, J. of Soc. Leather Trade Chem., 39: 3, p. 100, March 1950.

Herfeld: Method of Extracting Spruce Bark, J. of Soc. Leather Trade Chem. 34: 6, p. 246, June 1950.